United States Patent [19]
Hirosawa

[11] Patent Number: 5,164,837
[45] Date of Patent: Nov. 17, 1992

[54] METHOD OF CORRECTING SETUP PARAMETER DECISION CHARACTERISTICS AND AUTOMATIC SETUP APPARATUS USING A NEURAL NETWORK

[75] Inventor: Makoto Hirosawa, Kyoto, Japan

[73] Assignee: Dainippon Screen Mfg. Co., Ltd., Kyoto, Japan

[21] Appl. No.: 765,752

[22] Filed: Sep. 26, 1991

[30] Foreign Application Priority Data

Oct. 4, 1990 [JP] Japan .................................. 2-268063

[51] Int. Cl.$^5$ ........................ H04N 1/23; H04N 1/40; H04N 1/46; G06F 15/18
[52] U.S. Cl. ................................... 358/296; 358/443; 358/80; 395/21
[58] Field of Search .................... 358/296, 80, 443; 395/21, 23, 24

[56] References Cited
PUBLICATIONS

Counterpropagation Network, Robert Hecht-Nielsen, Neurocomputing (1991), pp.147-153.

*Primary Examiner*—Benjamin R. Fuller
*Assistant Examiner*—Scott A. Rogers
*Attorney, Agent, or Firm*—Lowe, Price, LeBlanc & Becker

[57] ABSTRACT

Image data of an original read by an image reader is analyzed by analyzer means to be supplied to a neural network. An operator inputs scene information and desired finish information to the neural network with data input means.

The neural network calculates setup parameter values in compliance with a conversion rule specified by predetermined weighting values and functional forms, and sets these values in an image data converter.

Then, the operator corrects the setup parameter values on the basis of finish condition of the produced color separation films. The corrected setup parameter values are inputted to leaning means. The leaning means computes proper weighting values with which the neural network calculates setup parameter values equal to or approximate to the corrected setup parameter values. Such proper weighting values are supplied to the neural network as new weighting values.

15 Claims, 17 Drawing Sheets

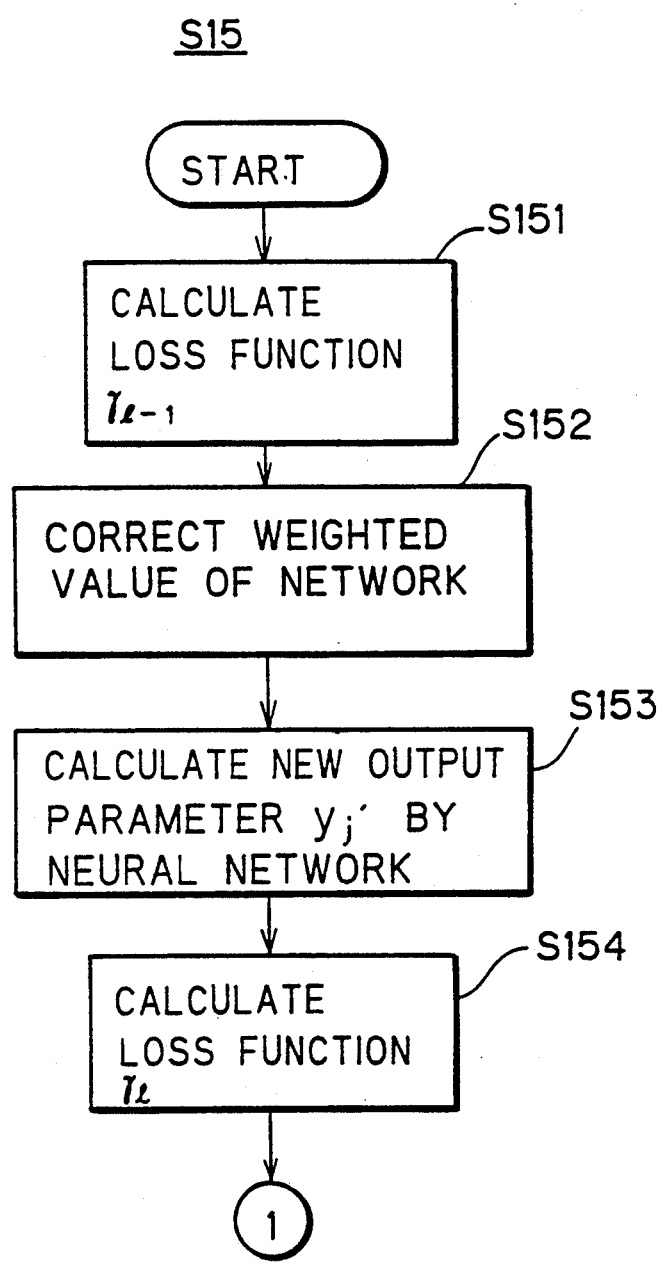

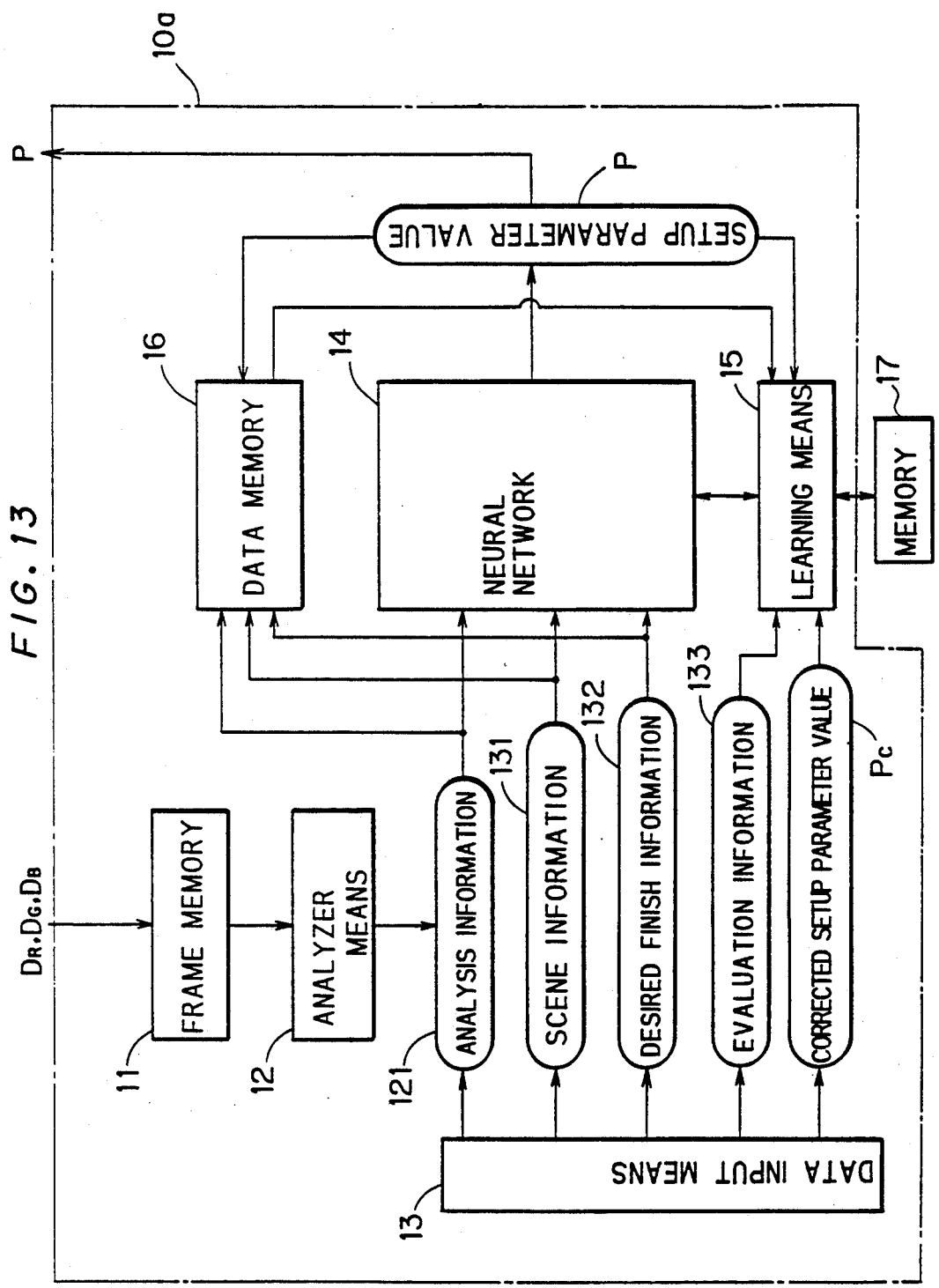

METHOD OF CORRECTING SETUP PARAMETER DECISION CHARACTERISTICS AND AUTOMATIC SETUP APPARATUS USING A NEURAL NETWORK

BACKGROUND OF THE INVENTION

1. Field of the Invention

The present invention relates to an automatic setup apparatus for an image data converter for converting image data of an original to image data for recording in a color scanner or the like and a method of correcting a setup parameter decision characteristic in the automatic setup apparatus.

2. Description of the Prior Art

As is well known in the art, a process scanner, which enables high-quality image reproduction, is formed by an image reader for optically reading an image of an original, an image data converter for convering read image data to image data for recording, an image recorder for exposure-recording the image data for recording on a photosensitive film etc. and the like. In order to perform high-quality image reproduction with such a scanner, a large number of regulation items required for color separation processing, such as reproducibility of gradation as well as enhancement of resolving power and sharpness etc., and reproducibility of color tones particularly in a color scanner for reproducing a color image, must be set in response to various types of orginals, so that the image data for recording converted by the aforementioned image data converter enter optimum states.

For example, highlight densities and shadow densities for respective ones of color components of blue (B), green (G) and red (R), highlight and shadow output dot % for respective ones of collor films of yellow (Y), magenta (M), cyan (C) and black (K), selective color collection as to a specific color component in the original, gradation (gradation correction) and sharpness enhancement etc. can be cited as typical ones of the aforementioned regulation items in the color scanner. Such a large number of regulation items, i.e., setup parameters in an image data converter, are not fixed but varied with originals as well as requirements as to how the images are to be reproduced. Therefore, high-quality image reproduction is enabled by optimum regulation of the setup parameters.

FIG. 11 is a block diagram showing the structure of such a conventional color scanner. Referring to the figure, an image reader 2 scans an original 1 to read its image, and outputs R, G and B signals for color components of red (R), green (G) and blue (B) as image data. In an ordinary color scanner, an unsharp signal U is also outputted in order to generate a sharpness enhancement signal, although the same is not shown in FIG. 11. An image data converter 3 converts the R, G and B (and U) signals to image data for recording. Namely, the image data converter 3 performs a series of processes such as conversion from the R, G and B (and U) signals to Y, M, C and K signals for color separation of yellow (Y), magenta (M), cyan (C) and black (K), gradation correction, color correction, control for enhancement or suppression of sharpness, magnification conversion and the like therein.

In order to perform these processes, however, setup parameter values must be previously set in the image data converter 3, as hereinabove described. Therefore, an operator empirically determines appropriate setup parameter values in response to the contents of the original and finish requirements for reproduced images, and manually sets the setup parameter values in the image data converter 3 through a setup parameter input unit 4. The parameter input unit 4 is formed by a keyboard, a mouse and the like. The image data for recording converted by the image data converter 3 are exposure-recorded in the form of halftone dots on photosensitive materials such as films by an image recorder 5, whereby color separation films 6 are produced.

FIG. 12 is a block diagram showing the structure of another conventional color scanner. Referring to the figure, an automatic setup apparatus $10_a$ comprises a frame memory 11 and an automatic setup parameter setting unit $12_a$ which is formed by a CPU, while other elements are identical to the elements in FIG. 11. First, image data (R, G and B signals) obtained by prescanning an image reader 2 are stored in the frame memory 11. Then, the automatic setup parameter setting unit $12_a$ automatically analyzes the image data stored in the frame memory 11, thereby obtaining setup parameters. Such an automatic analyzing method is disclosed in Japanese Patent Laying-Open Gazette No. 2-56175 or the like.

However, since the setup parameters obtained by the automatic setup parameter setting unit $12_a$ are restricted to partial setup parameters such as highlight densities and shadow densities for the R, G and B signals in the present circumstances, an operator manually sets empirically determined values as to a large number of remaining setup parameters through a setup parameter input unit 4, similarly to FIG. 11.

Since the setup parameters for the image data converter are set in the aforementioned manner in the conventional scanner, there are the following problems:

First, a skilled operator is required in order to obtain preferable recorded image in the prior art shown in FIG. 11, since the setup parameters are appropriately set on the basis of experience of the operator.

Further, dependence on the ability of the operator leads to appearance of individual difference of the operator himself in the conversion results of the image data, whereby it is impossible to construct a flexible image data conveter reflecting user's preference and tendency of finish quality.

In the prior art shown in FIG. 12, on the other hand, the automatic setup apparatus $10_a$ is introduced in order to solve the aforementioned problems. However, since the setup parameters obtained by this automatic setup apparatus $10_a$ are restricted to parts of parameters required for image data conversion, the remaining most parts are empirically set by the operator himself, and hence the problems caused in the prior art of FIG. 11 are not yet solved in the prior art shown in FIG. 12.

Such problems are not restrictive to conversion of image data in a process scanner, but common to apparatuses for reading image data of originals, converting the same to image data for recording and thereafter restoring images of originals in high quality.

SUMMARY OF THE INVENTION

The present invention is directed to a method of correcting setup parameter decision characteristics in an automatic setup apparatus for an image data converter for converting image data of an original to image data for recording. The method comprises the steps of (a) automatically analyzing image information of an original thereby obtaining a first parameter value reflecting the image information, (b) inputting a second parameter expressing condition to be referred to in recording of an image of the original in the automatic setup apparatus through first operation input means, (c) converting values of a parameter group including the first and second parameter values to setup parmeter values using a parameter conversion rule previously set in the automatic setup apparatus as the setup parameter decision characteristics, (d) setting the setup parameter values in the image data converter and thereafter converting the image of the original to image data for recording by the image data converter, (e) determining whether or not the parameter conversion rule is to be corrected with reference to a recorded image obtained from the image data for recording and supplying corrected setup parameter values suitable for conversion of image data of the original to the automatic setup apparatus through second operation input means when the same is to be corrected, (f) correcting the parameter conversion rule so that values equal or approximate to the corrected setup parameter values are obtained upon conversion of the parameter group, and (g) utilizing the parameter conversion rule corrected in the step (f) as the setup parameter decision rule for the step (c) for a next original.

Preferably, the parameter conversion rule in the step (c) is expressed by conversion function, and correction of the parameter conversion rule in the step (f) is performed by correcting functional form of the conversion function.

The present invention is further directed to an automatic setup apparatus for an image data converter for converting image data of an original to image data for recording. The automatic setup apparatus comprises (a) analyzer means for automatically analyzing image information of an original thereby providing a first parameter value reflecting the image information, (b) first operation input means for inputting a second parameter value expressing condition to be referred to in recording of an image of the original in the automatic setup apparatus, (c) a neural network connected to the analyzer means and first operation input means for converting values of a parameter group including the first and second parameter values to setup parameter values to be set in the image data converter using previously set weighting values and functional forms, (d) second operation input means for inputting corrected setup parameter values suitable for conversion of image data of the original in the automatic setup apparatus, and (e) learning means connected to the neural network and second operation input means, comprising (e-1) means for correcting the weighting values or the functional forms so that the setup parameter values converted by the neural network are equal to or approximate to the corrected setup parameter values supplied by the second operation input means, and (e-2) means for supplying the weighting values or the functional forms corrected in the step (e-1) to the neural network as new weighting values or new functional forms.

In the first aspect of the present invention, the values of the parameter group formed by the first parameter value obtained by automatically analyzing image information of the original and the second parameter value supplied by the operation input means are converted to setup parameter values by the parameter conversion rule previously set in the automatic setup apparatus, and the setup parameter values are set in the image data converter.

When an operator referring to a finally obtained recorded image finds that it is necessary to correct the parameter conversion rule, the parameter conversion rule is corrected so that the setup parameter values obtained as the result of conversion by the parameter conversion rule are equal or approximate to corrected setup parameter values provided by the second operation input means. Since the corrected parameter conversion rule is used as a new parameter conversion rule, optimum setup parameter values for obtaining a desired recorded image are automatically obtained by the new parameter conversion rule.

In the preferred second aspect, the parameter conversion rule in the first aspect is expressed by conversion function, whereby the parameter conversion rule is corrected by correcting the functional form so that optimum setup parameters can be automatically obtained similarly to the first aspect.

In the third aspect, further, the neural network converts the values of the parameter group to setup parameter values using previously set weighting values and functional forms. Then the learning means corrects the weighting values or the functional forms so that the setup parameter values are equal or approximate to corrected setup parameter values provided by the second operation input means. Consequently, the corrected weighting values or the corrected functional forms are used as new weighting values or new functional forms, whereby optimum setup parameter values are automatically obtained similarly to the first aspect.

The following effects can be attained according to the invention of claim 1:

(1) The operator may simply input only information, such as scene information and finish information, which can be easily determined from the original in normal operation, whereby the setup parameter values are automatically obtained by means such as a neural network supplied with a parameter conversion rule. Since the parameter conversion rule is corrected to a proper conversion rule if no desired image conversion result is obtained, even a relatively unskilled operator can perform proper setup after such correction is repeated. Therefore, it is possible to provide a usable and prevailable image data converter using the inventive method.

(2) Further, the parameter conversion rule is improved as the image data converter performs conversion of the image data, while the finally obtained conversion rule can be stored in a memory or the like so that the stored conversion rule is read out any time to perform image data conversion, whereby it is possible to implement flexible image data conversion corresponding to preference of an orderer for printing etc. and the tendency of picture quality changed with time.

According to the invention of claim 2, the parameter conversion rule is corrected by correction of functional form of conversion function, whereby correction processing is advantageously simplified.

According to the invention of claim 10, the aforementioned method is implemented using a neural network, whereby conversion and correction of the parameters can be systimatically performed.

A first object thereof is to obtain a method which can decide proper setup parameter values even if an operator is relatively inexperienced and an automatic setup apparatus suitable for execution thereof.

A second object of the present invention is to facilitate setup reflecting preference of an orderer for printing or the like.

These and other objects, features, aspects and advantages of the present invention will become more apparent from the following detailed description of the present invention when taken in conjunction with the accompanying drawings.

BRIEF DESCRIPTION OF THE DRAWINGS

FIG. 13 shows an automatic setup apparatus to which a memory is provided independently.

DESCRIPTION OF THE PREFERRED EMBODIMENTS

A. Structure and Schematic Operation of Apparatus

Figure 1:
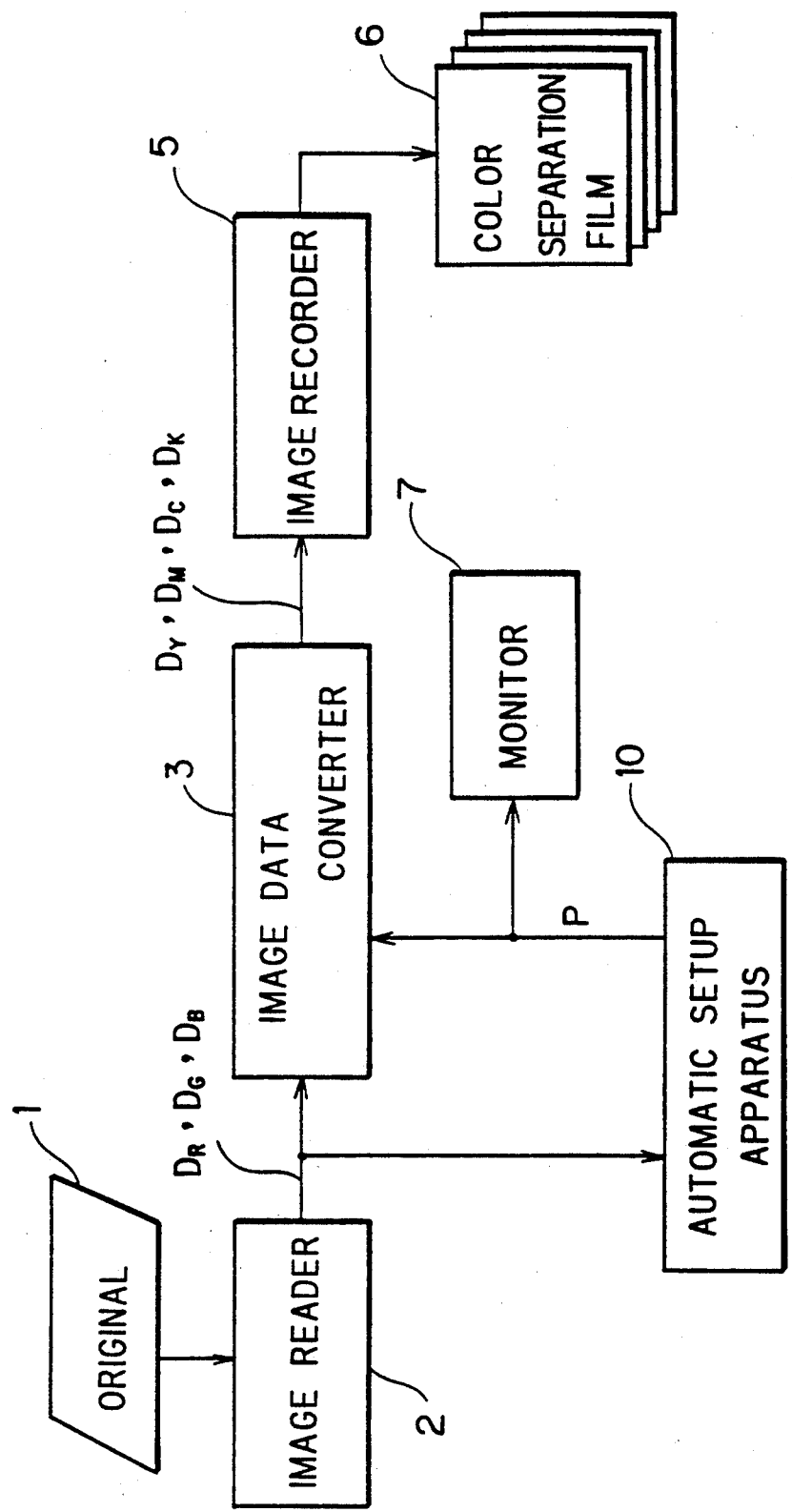
FIG. 1 is a block diagram showing the structure of a color scanner to which an automatic setup apparatus according to a preferred embodiment of the present invention is applied.

FIG. 1 is a block diagram showing the structure of a process color scanner to which an automatic setup apparatus according to a preferred embodiment of the present invention is applied. Referring to the figure, an image of an original 1 is read by an image reader 2 every pixel sequentially along scanning lines, so that image data (R, G and B signals) $D_R$, $D_G$ and $D_B$ for the respective color components are outputted. These image data $D_R$, $D_G$ and $D_B$ are inputted in an automatic setup apparatus 10 in prescanning, and in an image data converter 3 in main scanning. The automatic setup apparatus 10, having a structure described later, automatically obtains setup parameter values P of the image data converter 3. Since the obtained setup parameter values P are outputted to a monitor 7 of a CRT, a printer or the like, an operator can regularly confirm and manage the setup parameter values P. When the setup parameter values are set in the image data converter 3, the image data converter 3 converts the image data $D_R$, $D_G$ and $D_B$ received from the image reader 2 to image data $D_Y$, $D_M$, $D_C$ and $D_K$ of Y, M, C and K for recording, and the image data $D_Y$ to $D_K$ for recording are converted to halftone dot image signals in an image recorder 5 and thereafter exposure-recorded on photosensitive films or the like by on-off modulation of an exposure laser beam, to produce color separation films 6 recording images as to respective ones of Y, M, C and K.

Figure 2:
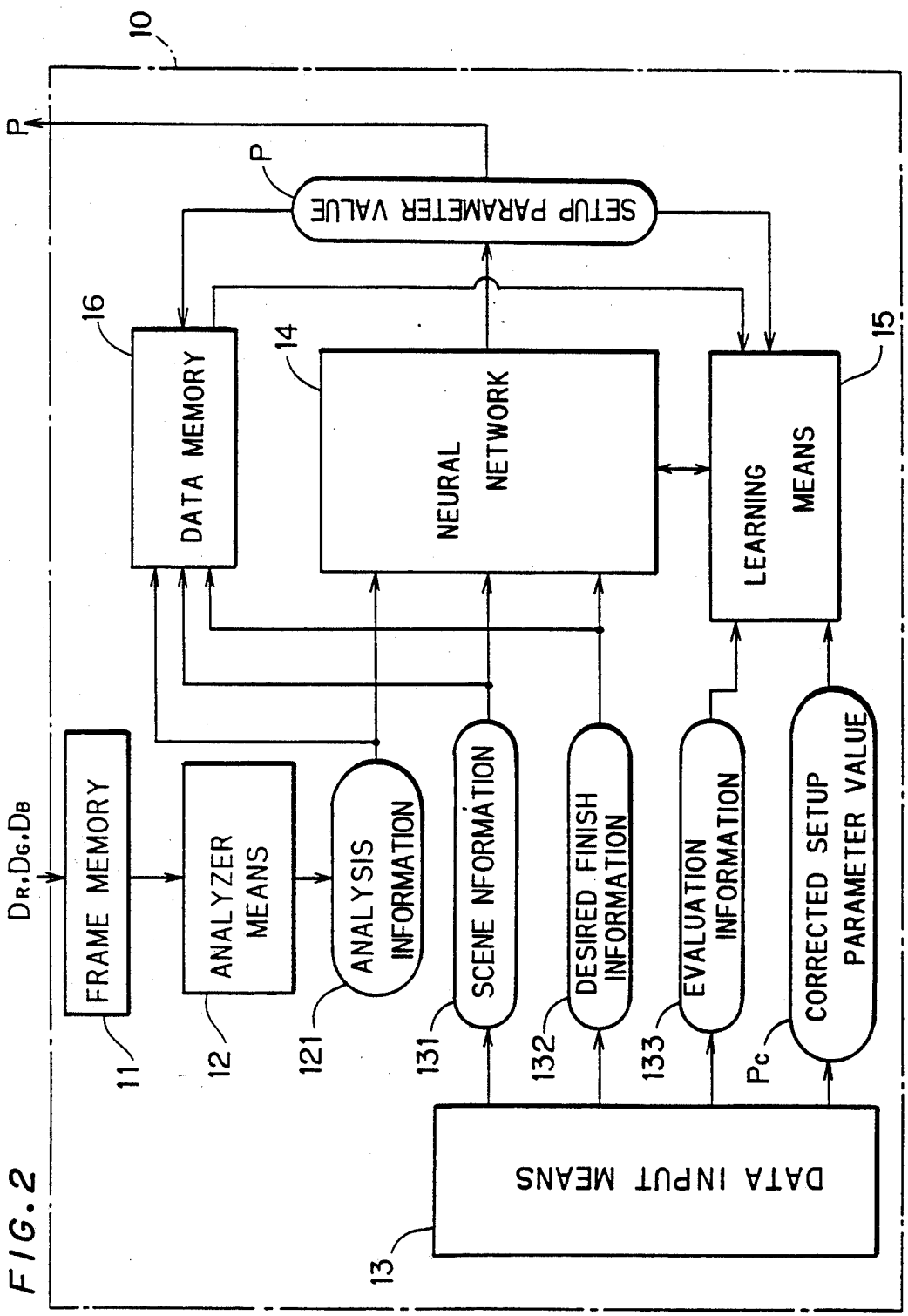
FIG. 2 is a functional block diagram showing the structure of the automatic setup apparatus according to the preferred embodiment of the present invention.

FIG. 2 is a functional block diagram showing the structure of the automatic setup apparatus 2. Analyzer means 12, learning means 15 etc. in FIG. 2 can be implemented by a microcomputer in a software manner. The output signals $D_R$, $D_G$ and $D_B$ from the image reader 2 are stored in a frame memory 11 and thereafter automatically analyzed by the analyzer means 12, so that analysis information 121, which is a first parameter value reflecting the image data $D_R$, $D_G$ and $D_B$, is obtained.

The operator decides condition to be referred to in recording of an image of the original 1, and inputs the same in a neural network 14, which is described later, from data input means 13 in the form of scene information 131 and desired finish information 132. The data 131 and 132 correspond to second parameter values in the present invention. The data input means 13 is formed by a keyboard, a mouse and the like, for example.

The analysis information 121, the scene information 131 and the desired finish information 132 are converted to the setup parameter values P by the neural network 14 having previously set weighting values, where the setup parameter values P are also called as color separation parameter values.

After the setup parameter values P are set in the image data converter 3 of FIG. 1 and main scanning is performed, evaluation information 133 having contents as described later and corrected setup parameter values $P_c$ are inputted from the data input means 13. The learning means 15 receives the evaluation information 133 and corrects the weighting values, which are supplied to the neural network 14, so that the setup parameter values P are as equal to the corrected setup parameter values $P_c$ as possible.

In this preferred embodiment, the data input means 13 has functions for serving both as "first and second operation input means" in the present invention. Further, the analysis information 121, the scene information 131, the desired finish information 132 and the setup parameter values P are stored in a data memory 16 at least until the operation of the learning means 15 is terminated.

B. Operation of Preferred Embodiment

Figure 3A:
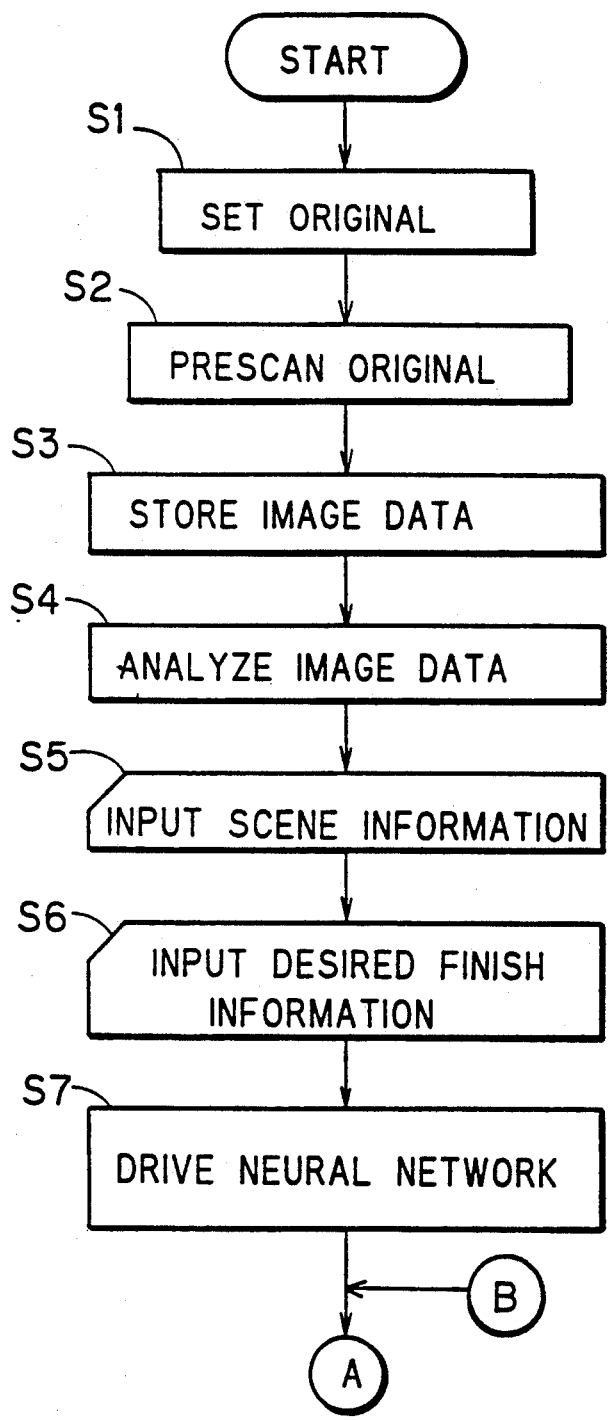
FIGS. 3A and 3B are flow charts showing the operation of the color scanner shown in FIG. 1, FIGS. 4A to 4C are flow charts showing operations at a step S7 in the operation of the color scanner shown in FIG. 3A, FIGS. 5A and 5B are flow charts showing operations at a step S15 in the operation of the color scanner shown in FIG. 3B, FIGS. 6A to 6D show explanatory diagrams illustrating examples of density histograms.
Figure 3B:
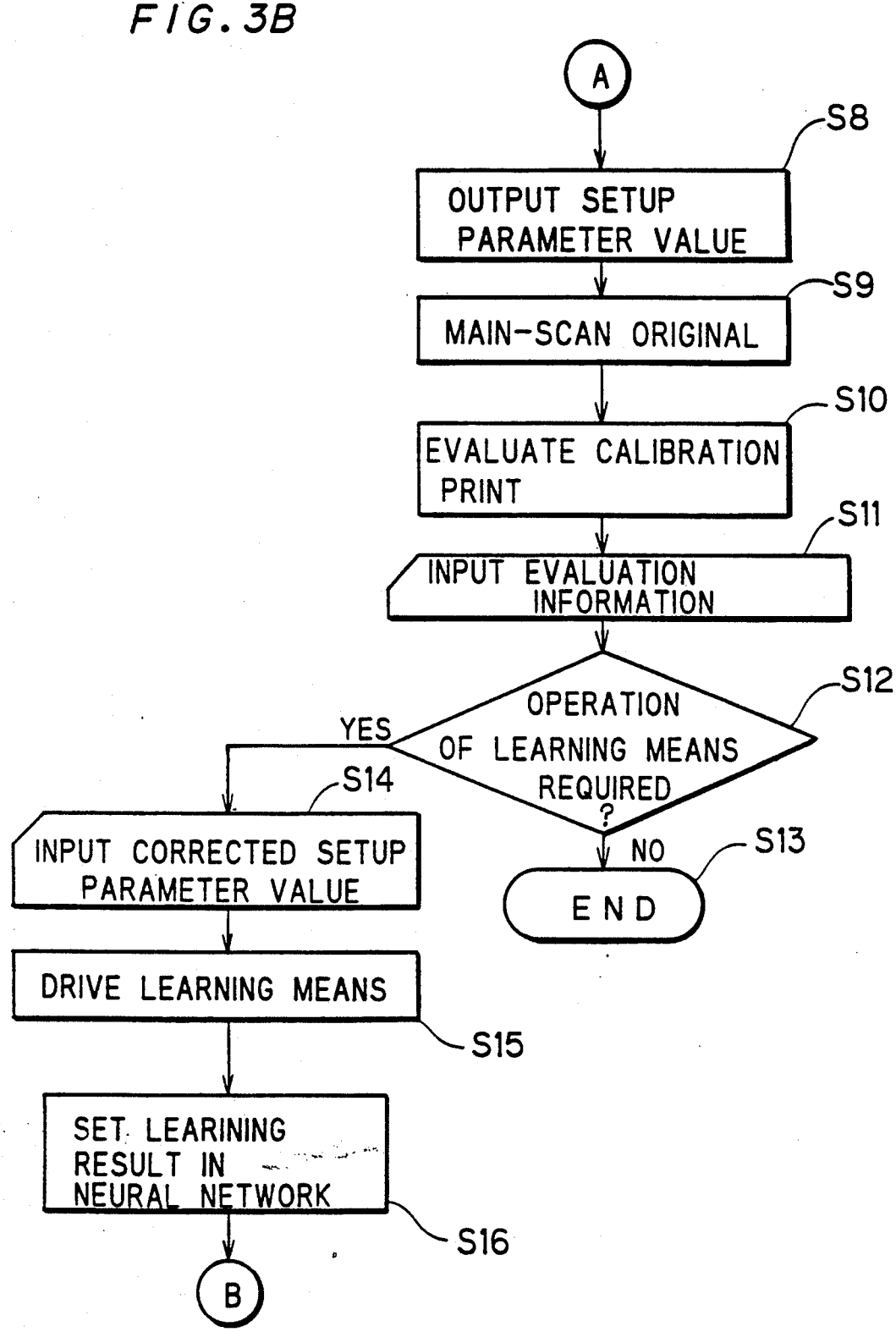

FIGS. 3A and 3B are flow charts showing the operation of the process color scanner.

At a step S1, the original 1 is set in a prescribed position of the color scanner.

At a step S2, the image reader 2 prescans the image of the original 1, to generate the image data $D_R$, $D_G$ and $D_B$. Such reading may be executed while performing pixel skipping etc.

At a step S3, the image data $D_R$, $D_G$ and $D_B$ obtained at the step S2 are stored in the frame memory 11.

Figure 6C:
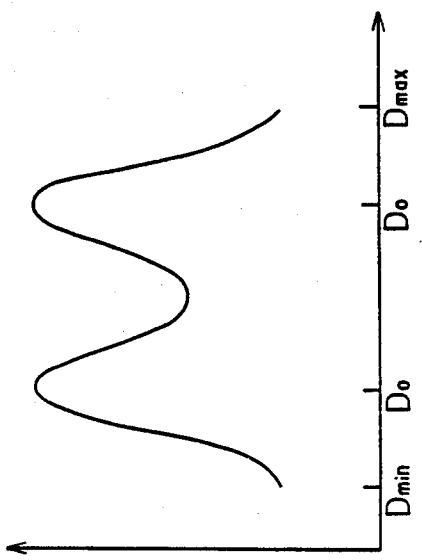
Figure 6D:
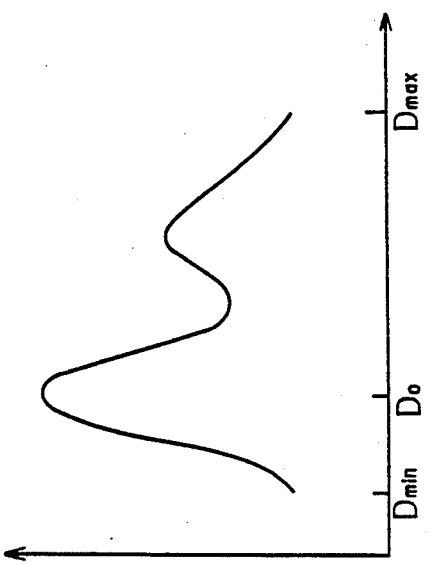
Figure 6A:
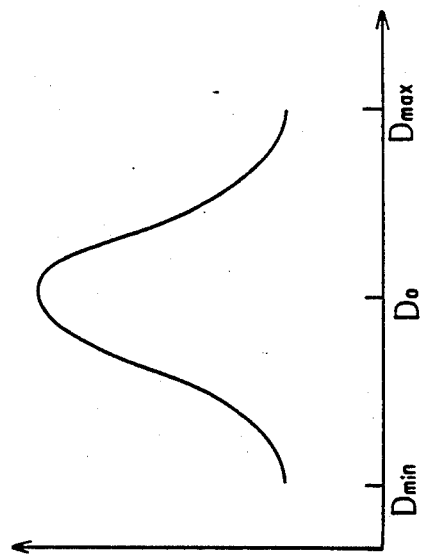
Figure 6B:
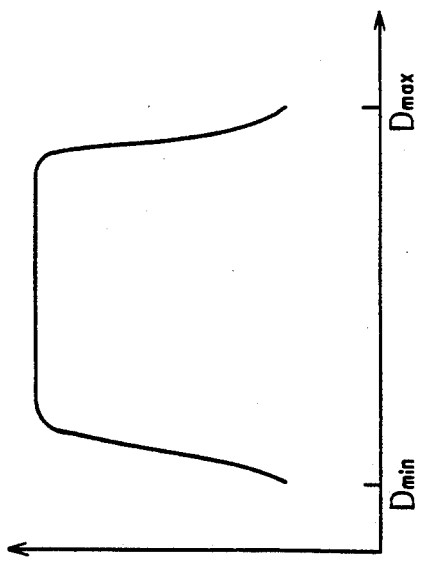

At a step S4, the image data $D_R$, $D_G$ and $D_B$ stored in the frame memory 11 are read out and the analysis information 121 is obtained by the analyzer means 12. For example, the analysis information 121 includes maximum densities, minimum densities, average densities, densities at peak points and dispersion in density histograms, form classifications of density histograms, and the like for R, G and B color components for every pixel of the original 1. FIGS. 6(a) to 6(d) show examples of various density histograms, wherein horizontal axes represent densities and vertical axes represent frequencies of occurrence of the respective densities, whereby the histograms are expressed as curves. FIG. 6A shows a density histogram which is substantially in normal distribution, and symbols $D_{max}$, $D_{min}$ and $D_O$ represent the maximum density, the minimum density and density at a peak point, respectively. FIG. 6B shows a histogram with uniform distribution of the densities, while each of FIGS. 6(c) and 6(d) shows a histogram having two peak points. An algorithm for obtaining such analysis information in the analyzer means 12 is not particularly complicated but can be calculated at a sufficiently high speed by the present CPU and software.

At a step S5, the scene information 131 is supplied through the data input unit 13. The scene information 13 is directly inputted by the operator, to express features of the image of the original 1. For example, the scene information 131 includes information of an image classification content expressing whether the image of the original 1 is a human figure or an animal figure, or a picture of still life such as an ornament or a landscape of the sky, the sea or the like, shooting condition as to whether the exposure is normal or in an overexposure or underexposure state etc., the type of the original as to whether the same is a positive original or a negative original, and the like. Since anyone can easily determine the scene information 13 through the original as hereinabove described, the operator may not be skilled in inputting of the scene information 13. While it is ideal to also automatically obtain the scene information 131 not manually but by the analyzer means 12, it is more reliable to utilize the operator's recognition since the pattern recognition technique etc. is now developing and still falls behind human recognition ability. The scene information 131 is inputted by designating a predetermined code number for every scene, for example.

At a step S6, the desired finish information 132 is supplied by the data input unit 13. The desired finish information 132, which is directly inputted by the operator, expresses requirement as to how a recorded image or a printed image is to be finished. For example, the finish information 132 includes information as to brightness, contrast, sharpness, magnification, finish size and the like. Since the desired finish information 132 is basically indicated by a print orderer, the operator inputs the finish information 132 in accordance with the indication, while the operator himself determines and inputs the same if the print orderer gives no indication. Also in the latter case, the operator may not be skilled in inputting of the desired finish information 132 since the desired finish information 132 is easy to grasp with intuition while the desired finish information may be set at intermediate values if the same is hard to determine.

At a step S7, the neural network 14 operates upon receiving the analysis information 12, the scene information 131 and the desired finish information 132. As explained in "Neural Network Information Processing" by Hideki Asoh (Sangyo Tosho K.K.) or Nikkei Electronics, 1989. 8. 21 (No. 480) pp. 211-217, for example, the neural network 14 is an advanced parallel distributed type information processing mechanism modeled on a neural network, in which a plurality of units (called nodes or neurons) performing simple information processing form a network by coupling (called connection or synapse) between the units, and the same can be implemented by a CPU and software, or by dedicated hardware. Therefore, the neural network 14 has such a feature that the same can be provided with network self-organizability (called learning ability) by flexible change of coupling strength (called weighting) of each connection between an input information group and an output information group.

Figure 7:
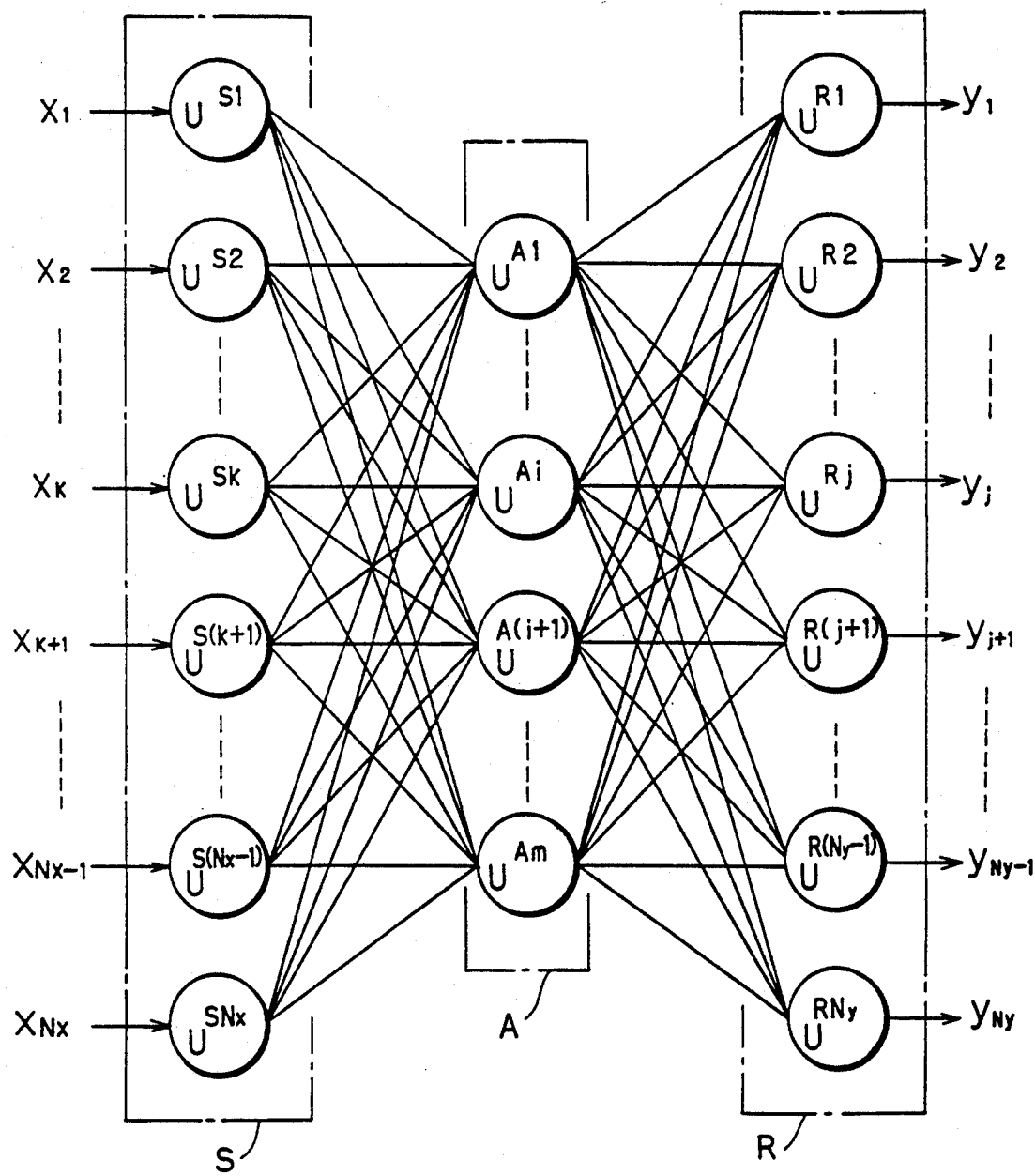
FIG. 7 is a conceptual diagram showing an exemplary structure of a perceptron neural network.

FIG. 7 shows an exemplary neural network 14 implemented by a perceptron network, which is a typical hierarchial network including no feedback coupling. While this figure shows a hierarchial (cascade) network which is formed by three types of layers including an S layer as input layers, an A layer as intermediate layers and an R layer as output layers for simplifying illustration, a hierarchial network of n layers is employed in general. Referring to the figure, the S layer is formed by $N_x$ nodes, and $N_x$ input data (input parameters) are supplied to the S layer. Namely, a k-th input parameter $x_k$ is stored in a k-th node $u^{Sk}$ of the S layer. The input parameters $x_k$ correspond to values of respective components of the aforementioned analysis information 121, scene information 131 and desired finish information 132. For example, the maximum densities of the image data $D_R$, $D_G$ and $D_B$ are supplied as input parameters $x_1$, $x_2$ and $x_3$ respectively and the minimum densities of the image data $D_R$, $D_G$ and $D_B$ are supplied as input parameters $x_4$, $x_5$ and $x_6$, while other respective data are also similarly supplied in a sequential manner.

On the other hand, the A layer is formed by m nodes, and outputs from all nodes of the S layer are inputted in the respective nodes of the A layer.

The R layer is formed by $N_y$ nodes and outputs from all nodes of the A layer are inputted in the respective nodes of the R layer, while a j-th node $u^{Rj}$ of the R layer outputs a j-th setup parameter (output parameter) $Y_j$. The setup parameters $Y_j$ include highlight densities and shadow densities with respect to the image data $D_R$, $D_G$ and $D_B$ and aperture size and aperture configuration in generation of an unsharp signal, such that the highlight densities with respect to the image data $D_R$, $D_G$ and $D_B$ are outputted as output parameters $Y_1$, $Y_2$ and $Y_3$ respectively and shadow densities with respect to the image data $D_R$, $D_G$ and $D_B$ are outputted as $Y_4$, $Y_5$ and $Y_6$ respectively, while other parameters are also similarly outputted as output parameters $Y_j$ in a sequential manner. The setup parameter values P shown in FIGS. 1 and 2 express the overall output parameters $Y_1$ to $Y_{Ny}$.

Figure 4A:
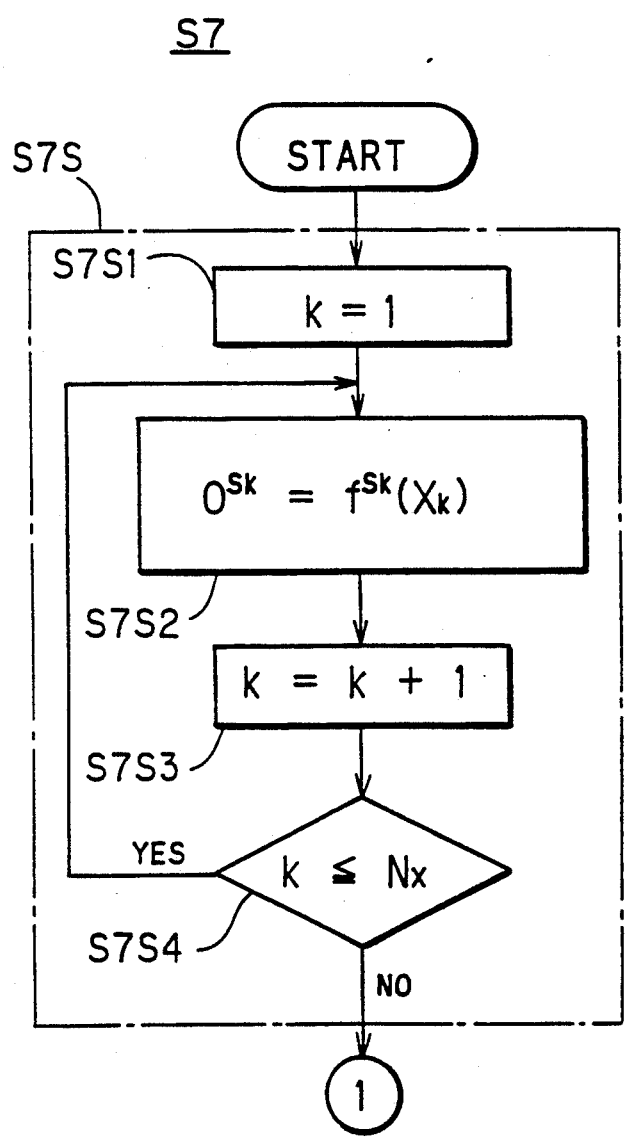
Figure 4B:
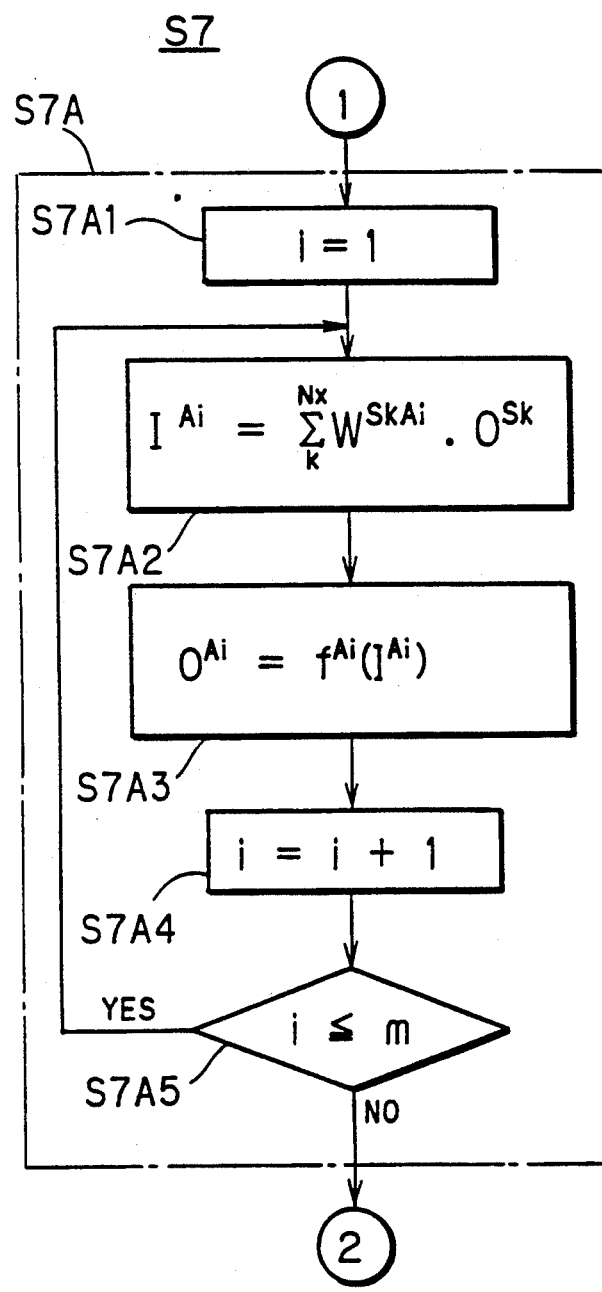
Figure 4C:
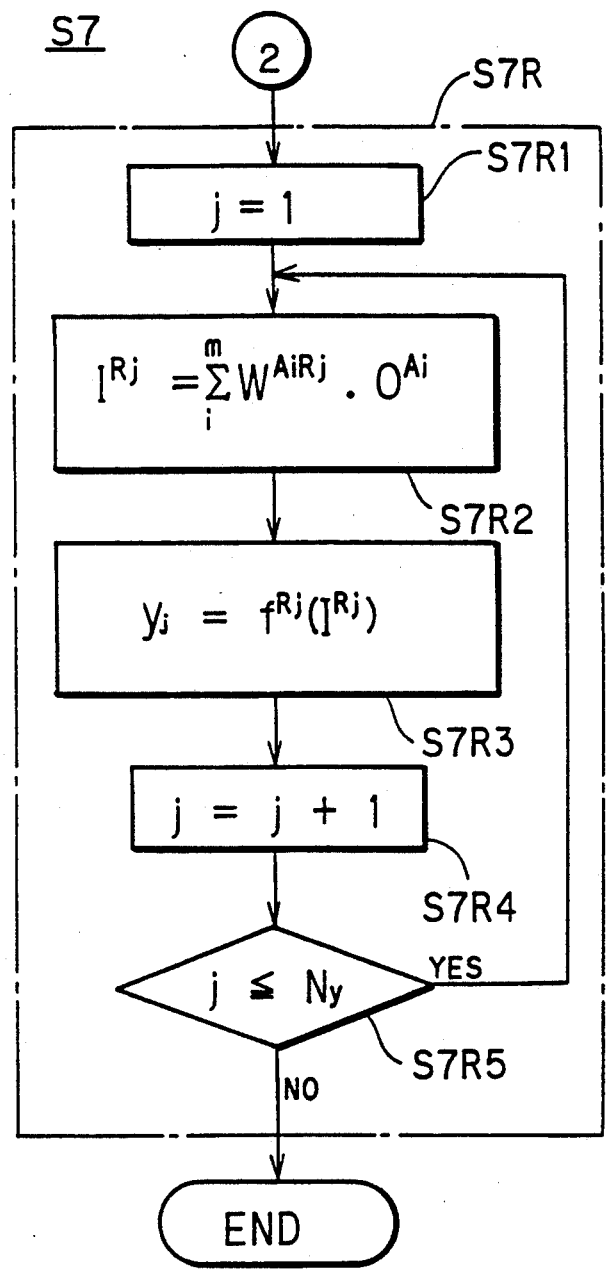

FIGS. 4A to 4C are flow charts showing the operations at the step S7 in detail as to the perceptron network shown in FIG. 7, and this is roughly classified into steps S7S showing operations in the S layer, steps S7A showing operations in the A layer and steps S7R showing operations in the R layer.

At a step S7S1, information processing in a first node $u^{S1}$ of the S layer is started. While processing in the node $u_{S1}$ is then started at a step S7S2, a k-th node $u^{Sk}$ is hereafter described in order to generalize the following description, supposing that:

$$k = 1 \qquad (1)$$

At the step S7S2, a conversion with an input/output function $f^{Sk}$ of the k-th node $u^{Sk}$ is performed. Namely, the input/output parameter $x_k$ is converted to output data $O^{Sk}$ of the k-th node $u^{Sk}$ by the following equation:

$$O^{Sk} = f^{Sk}(x_k) \qquad (2)$$

Figure 8C:
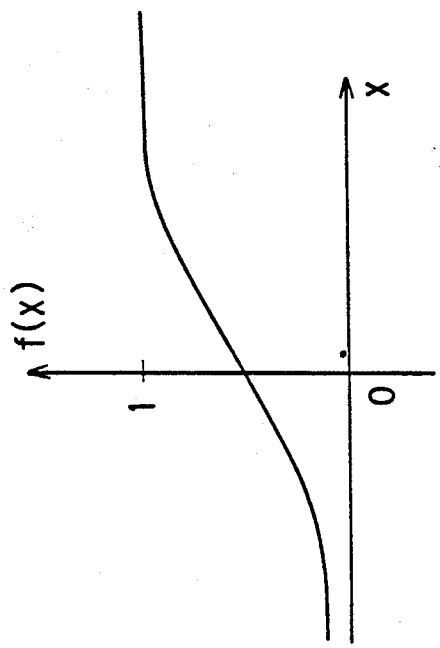
FIGS. 8A to 8D show explanatory diagrams illustrating examples of input/output functions $f^{Sk}$.
Figure 8D:
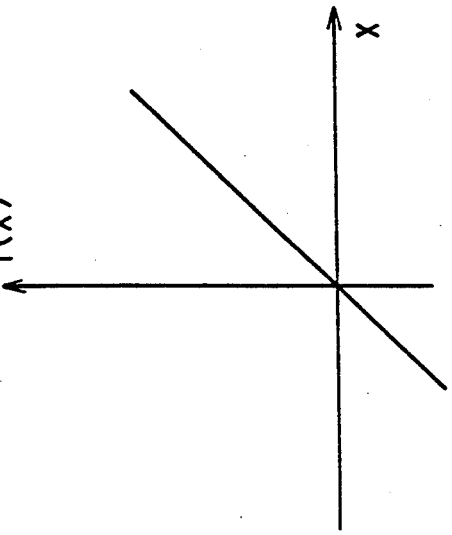
Figure 8A:
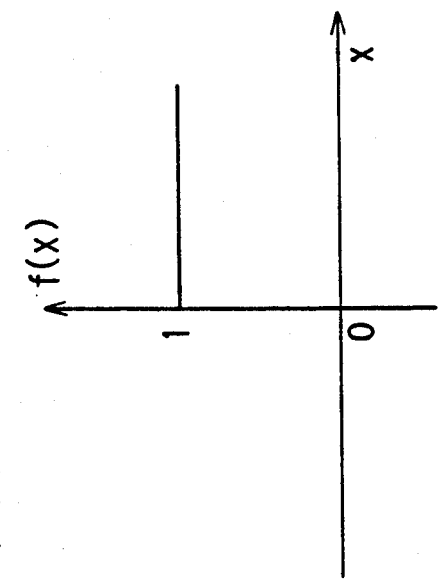
Figure 8B:
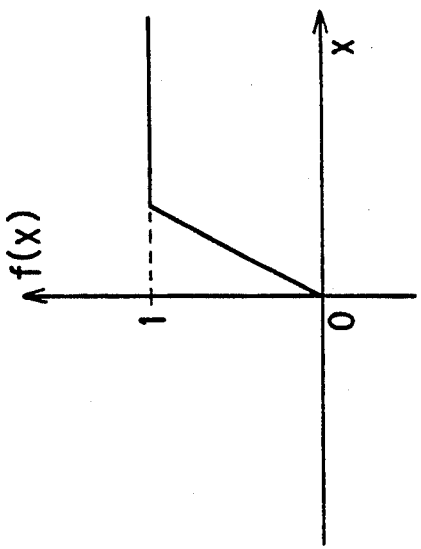

The input/output function $f^{Sk}$ is a previously set function, and any one of functions shown in FIGS. 8(a) to 8(d) may be selected, for example. FIG. 8A shows a threshold function and FIG. 8B shows a piecewise linear function, while FIG. 8C shows a logistic function and FIG. 8D shows an identity function.

At a step S7S3, the information processing at the k-th node $u^{Sk}$ is terminated and the process is advanced to the next (k+1)-th node $u^{S(k+1)}$. Namely, it is supposed as follows:

$$k = k+1 \tag{3}$$

At a step S7S4, a determination is made as to whether or not a k-th node to be sequentially subjected to information processing is an $N_x$-th node. Namely, in the case of:

$$k \leq N_x \tag{4}$$

information processing at the steps S7S2 to S7S3 is again repeated, whereby information processing is performed as to all nodes of the S layer. At a point of time ($k > N_x$) when information processing at the $N_x$-th node $u^{SN_x}$ is terminated, the operations at the step S7S are terminated and the process is advanced to the steps S7A.

At a step S7A1, information processing at a first node $u^{A1}$ of the A layer is started. Similarly to the above, an i-th node $u^{Ai}$ is hereafter described in order to generalize the following description, supposing that:

$$i = 1 \tag{5}$$

Figure 9:
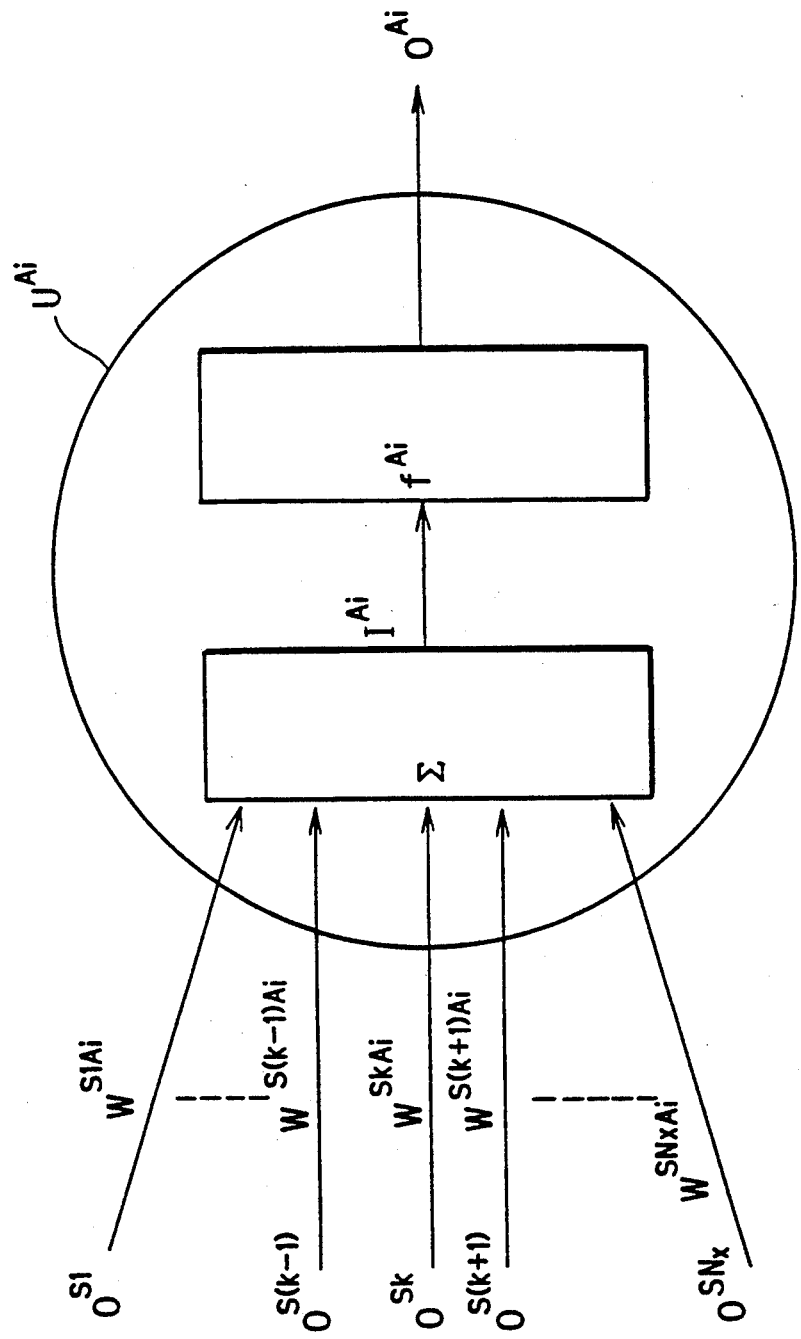
FIG. 9 is a conceptual diagram expressing a series of information processing at an i-th node $u^{Ai}$ of an A layer, which is an intermediate layer in the structure of the neural network shown in FIG. 7, FIGS. 10A to 10C show explanatory diagrams illustrating various exemplary structures of neural networks.

At a step S7A2, the sum $I^{Ai}$ of products of output data $O^{Sk}$ from all nodes of the S layer inputted in the i-th node $u^{Ai}$ and weighting values $W^{SkAi}$, which are described later, is obtained. FIG. 9 is a conceptual diagram expressing a series of information processing in the i-th node $u^{Ai}$ of the A layer. Referring to this figure, the output data $O_{Sk}$ from the node $u^{Sk}$ of the S layer is weighted by connection from the k-th node of the S layer to the i-th node of the A layer. Namely, an amount corresponding to the product of the output data $O^{Sk}$ and the weighting value $W^{SkAi}$ is inputted in the i-th node $u^{Ai}$ of the A layer. Consequently, a weighting sum $I^{Ai}$ of output data $O^{Sk}$ from nodes of the S layer inputted in the i-th nodes $u^{Ai}$ is obtained as follows:

$$I^{Ai} = \sum_{k=1}^{N_x} W^{SkAi} \cdot O^{Sk} \tag{6}$$

Each weighting value $W^{SkAi}$ is a previously set value.

At a step S7A3, a conversion with an input/output funciton $f^{Ai}$ of the i-th node $u^{Ai}$ of the A layer is performed, similarly to the step S7S2. Namely, the weighting sum $I^{Ai}$ is converted to output data $O^{Ai}$ of the i-th node $u^{Ai}$ of the A layer by the following equation (7):

$$O^{Ai} = f^{Ai}(I^{Ai}) \tag{7}$$

The input/output function $f^{Ai}$ is also a previously set function, similarly to the input/output function $f^{Sk}$.

At steps S7A4 and S7A5, operations corresponding to the aforementioned steps S7S3 and S7S4 are performed respectively. Therefore, when information processing in an m-th node $u^{Am}$ is terminated, the operations at the steps S7A are completed and the process is advanced to the next steps S7R.

At a step S7R1, information processing at a first node $u^{R1}$ of the R layer is started, while a j-th node $u^{Rj}$ is hereafter described in order to generalize the following description, supposing that:

$$j = 1 \tag{8}$$

An operation at a step S7R2 corresponds to the aforementioned step S7A2, and a weighting sum $I^{Rj}$ of input data of the j-th node $u^{Rj}$ is obtained by the following equation:

$$I^{Rj} = \sum_{i=1}^{m} W^{AiRj} \cdot O^{Ai} \tag{9}$$

Each weighting value $W^{AiRj}$ is also a previously set value.

An operation at a step S7R3 also corresponds to the step S7S2 or the step S7A3, and an output parameter $y_j$ of the j-th node $u^{Rj}$ is obtained by the following equation:

$$Y_j = f^{Rj}(I^{Rj}) \tag{10}$$

The input/output function $f^{Rj}$ is also a previously set function, similarly to the input/output functions $f^{Sk}$ and $f^{Ai}$.

Operations at steps S7R4 and S7R5 correspond to the aforementioned steps S7A4 and S7A5 respectively, and when an output parameter $y_{Ny}$ of an $N_y$-th node $u^{RNy}$ is obtained, all of the series of operations is completed.

Figure 10A:
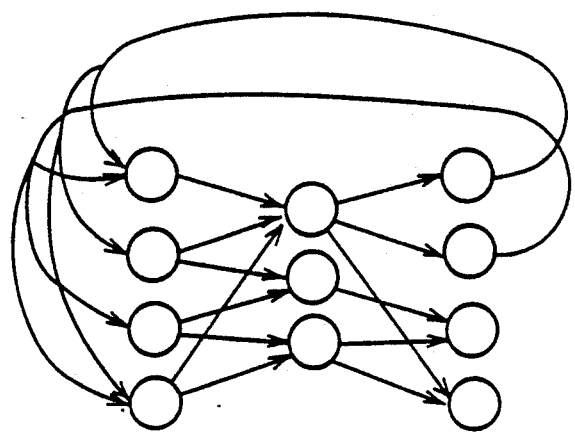
Figure 10B:
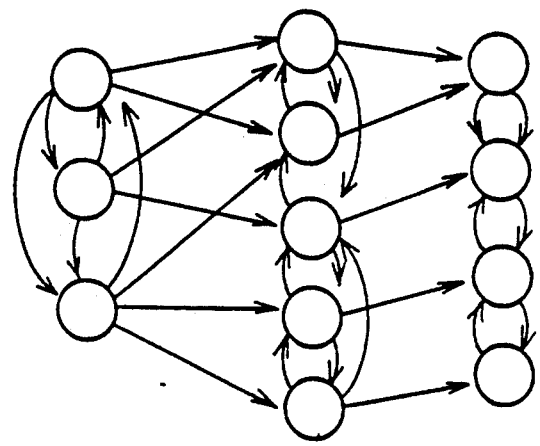
Figure 10C:
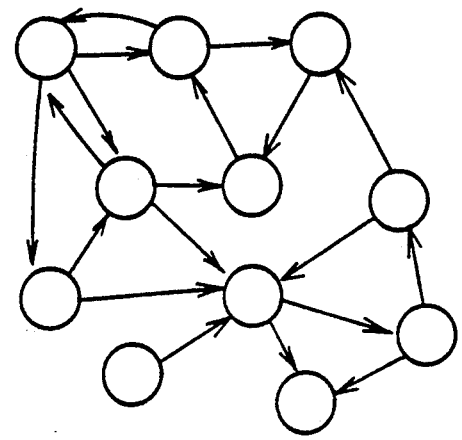
Figure 11:
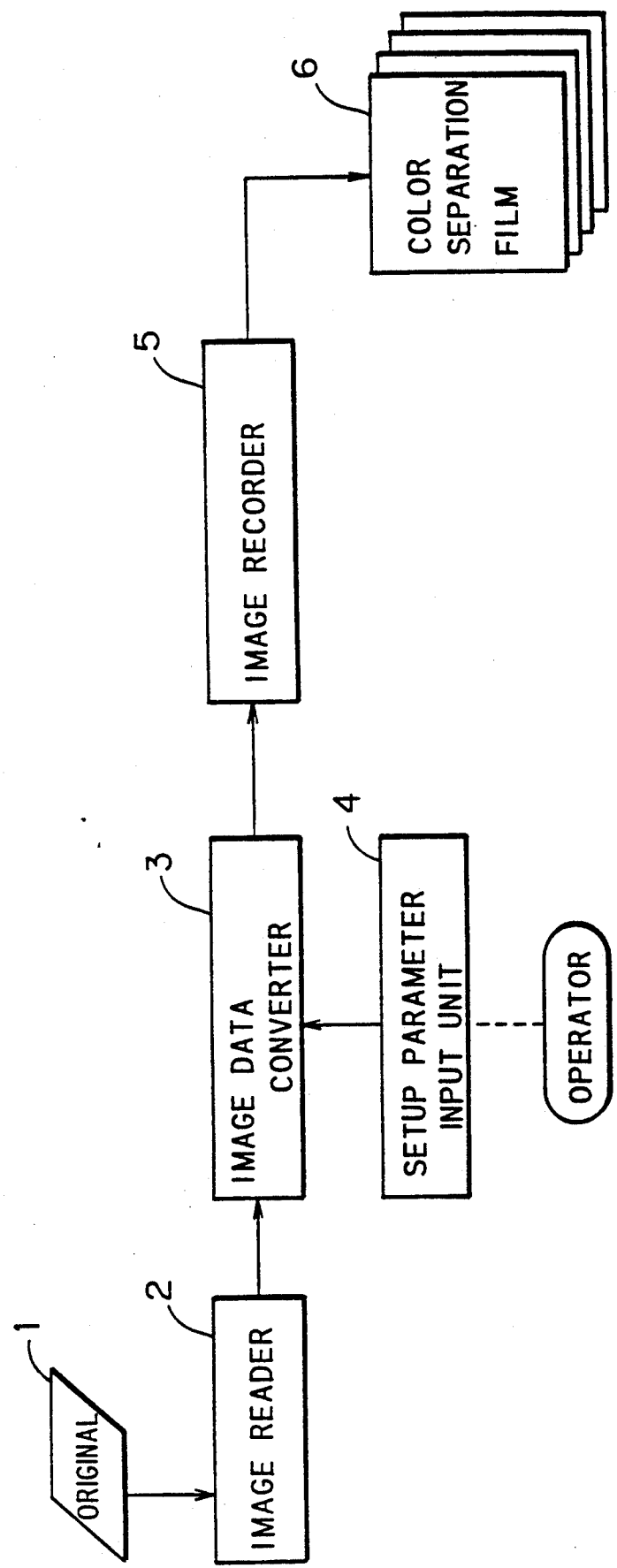
FIGS. 11 and 12 are block diagrams showing structures of conventional color scanners.
Figure 12:
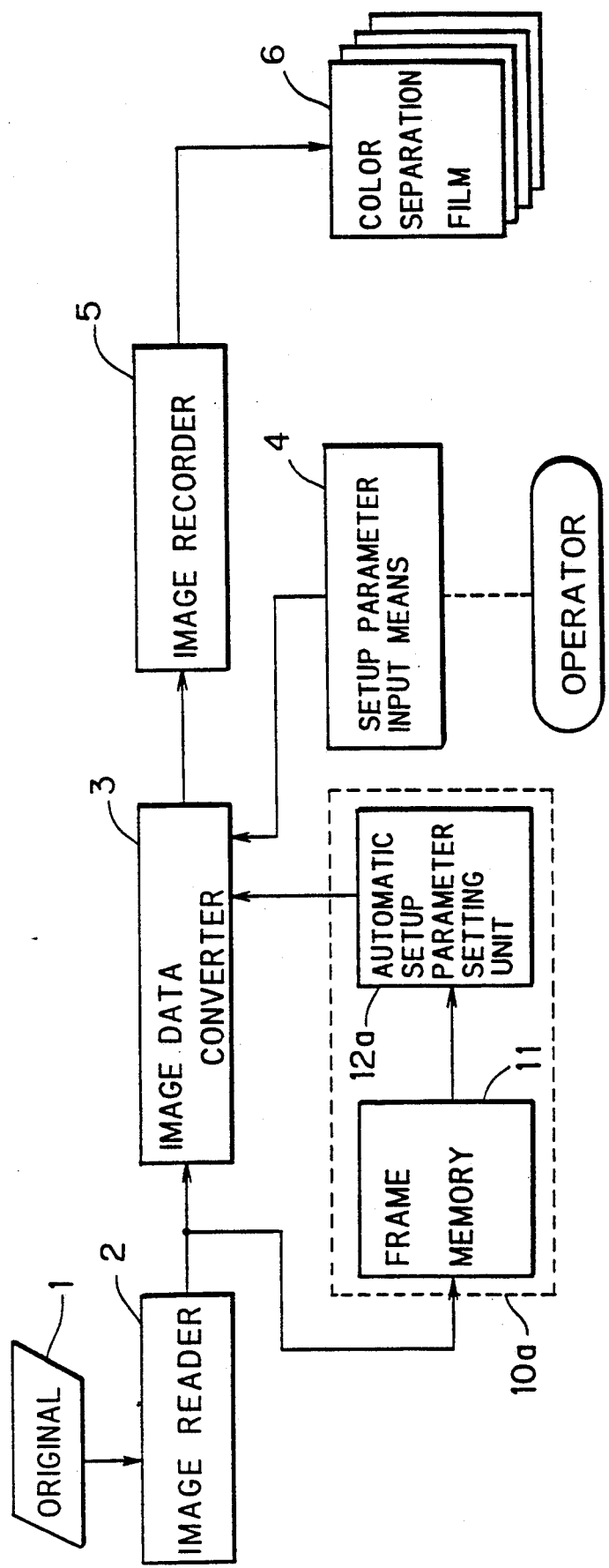

While the neural network 14 is formed by a perceptron network in the above description, a hierarchial network may be formed by a network including feedback coupling as shown in FIG. 10A, a network having in-layer coupling as shown in FIG. 10B, an interconnected network shown in FIG. 10C, or the like.

When the aforementioned operation at the step S7 is neural network 14 at a step S8 shown in FIG. 3B, to be displayed on the monitor 7 and set in the image data converter 3. Further, the setup parameters P are temporarily stored in the data memory 16.

At the step S9, the image reader 2 mainly scans the screen of the original 1 since the setup conditions for the image data converter 3 have been set in the preceding step, whereby the image data $D_R$, $D_G$ and $D_B$ are obtained. The image data $D_R$, $D_G$ and $D_B$ are inputted in the image data converter 3 through switches (not shown) and converted to image data for recording while being subjected to color separation processing in accordance with the aforementioned setup parameter values P by the image data converter 3, so that the color separation films 6 are thereafter produced by the image recorder 5.

At a step S10, printing plates are produced on the basis of the produced color separation films 6 to perform calibration printing using the same, while a finished state of the calibration printing is evaluated by an evaluator. The evaluator is the print orderer or a skilled operator. If the finished state satisfies requirement, it is not necessary to correct the setup parameters P obtained at the step S7, since the same are at the optimum values or approximate thereto. If the finished state is evaluated to be not satisfying the requirement, however, it is necessary to correct the setup parameter values P. In either case, the evaluation result is transmitted from the evaluator to the operator as evaluation information 133.

At a step S11, the operator inputs the evaluation information 133 in the learning means 15 by the data input unit 13. The evaluation information 133 reflects the evaluation result of the finished state of the calibration printing (and hence the color separation films 6 forming the basis thereof), as well as indicates whether or not the learning means 15 is to be driven. Since the operator may simply input the evaluation information 133 decided by the evaluator, no burden is caused in operation of the scanner.

At a step S12, the evaluation information 133 is received and a determination is made as to whether or not the learning means 15 is driven. For example, the operator inputs a digital signal of "1" corresponding to YES when the learning means 15 is to be driven, while he can input a digital signal of "0" corresponding to NO when the learning means 15 may not be driven. In this case, the learning means 15 enters an ON state if the signal of YES is inputted as the evaluation information 133, and the process is advanced to a step S14. If the signal of NO is inputted as the evaluation information 133, on the other hand, the process is advanced to a step S13 while the learning means 15 remains in an OFF state, and the entire steps are terminated.

The operator can also input marks as the evaluation information 133, when the evaluator marks finished states of the color separation films 6 through calibration printing. In this case, a reference mark is previously stored in the learning means 15, so that the learning means 15 is driven if the evaluation information 133 is less than the reference mark and the process is advanced to the step S14.

The determination as to whether or not the learning means 15 is to be driven may not be made by the evaluation information 133 but can be made by information as to whether or not corrected color separation parameter values $P_c$ as described later are inputted. In this case, the corrected color separation parameter values $P_c$ themselves also play the role of the evaluation information 133.

At the step S14, the operator checks the setup parameter values P displayed on the monitor 7, corrects parts of the setup parameter values P to attain a desired finished state, and inputs the corrected setup parameter values $P_c$ in the learning means 15 by the data input means 13. Therefore, the operator must be skilled to some extent in this stage, while an unskilled operator inputs the corrected setup parameter values $P_c$ on trial and error if there is no skilled operator.

At a step S15, the learning means 15 starts a learning operation of the neural network 14 so that the neural network 14 outputs the corrected setup parameter values $P_c$ when data identical to the data 121, 131 and 132 inputted when the setup parameter values P are obtained are again inputted. Namely, the learning means 15 corrects weighting values of respective connections previously set in the neural network 14 in accordance with a prescribed algorithm. While various proposals have been made as to such an algorithm, an error back propagation algorithm is employed here.

Figure 5B:
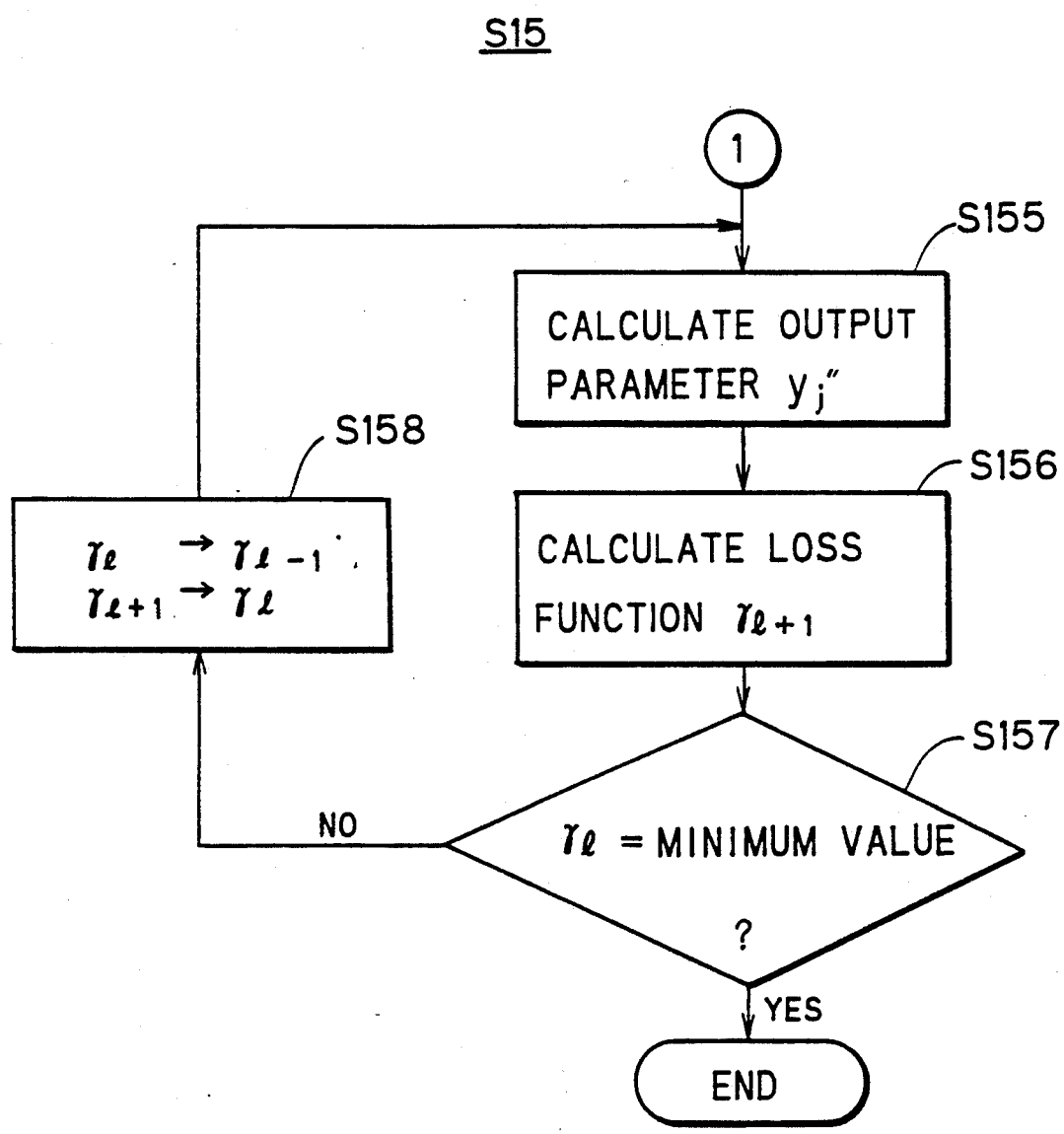

FIGS. 5A and 5B are flow charts showing operations of the step S15 in detail. At a step S151, a loss function $\gamma_{l-1}$ is calculated. The loss function $\gamma_{l-1}$ is a summation of square of difference between an uncorrected output parameter $y_j$ and a corrected color separation parameter $t_j$ (corresponding to each component of the corrected setup parameter values $P_c$), as defined in the following equation (11):

$$\gamma_{l-1} = \sum_{j=1}^{N_y} (y_j - t_j)^2 \quad (11)$$

Every time the output parameter $y_j$ is corrected at the steps as described below, the loss function $\gamma_{l-1}$ approaches its minimum value. Such a learning method is known as a convergence theorem. Therefore, a series of operations are convergence theorem. Therefore, a series of operations are performed in the following steps to evaluate the minimum value of the loss function $\gamma_{l-1}$ on the basis of this theorem.

At a step S152, weighting values $W^{SkAi}$ and $W^{AiRj}$ of respective connections are corrected by correction amounts $\Delta W^{SkAi}$ and $\Delta W^{AiRj}$ expressed in the following equations (12) and (13):

$$\Delta W^{SkAi} = -\epsilon \partial \gamma_{l-1} / \partial W^{SkAi} \quad (12)$$

$$\Delta W^{AiRj} = -\epsilon \partial \gamma_{l-1} / \partial W^{AiRj} \quad (13)$$

where $\epsilon$ represents a parameter for deciding the value of single correction, which is taken at a small positive number. Then, corrected new weighting values are employed as weighting values of each connection. Namely, $$W_T^{SkAi} = W^{SkAi} + \Delta W^{SkAi} \quad (14)$$

$$W_T^{AiRj} = W^{AiRj} + \Delta W^{AiRj} \quad (15)$$

At a step S153, the neural network 14 is again driven using the weighting values $W_T^{SkAi}$ and $W_T^{AiRj}$ obtained by the equations (14) and (15), to calculate a corrected new output parameter $y_j'$.

At a step S154, a loss function $\gamma_l$ expressed in the following equation (16) is calculated using the new output parameter $y_j'$:

$$\gamma_l = \sum_{j=1}^{N_y} (y_j' - t_j)^2 \quad (16)$$

At the step S155, the output parameter $y_j'$ is further corrected similarly to the steps S152 and S153, to calculate a new output parameter $y_j''$.

At a step S156, a loss function $\gamma_{l+1}$ is similarly calculated by the following equation (17):

$$\gamma_{l+1} = \sum_{j=1}^{N_y} (y_j'' - t_j)^2 \quad (17)$$

At a step S157, the loss functions $\gamma_{l-1}$, $\gamma_l$ and $\gamma_{l+1}$ obtained in the aforementioned steps are compared with each other, to determine whether or not the loss functions $\gamma_l$ becomes the minimum value. Namely, it is determined that the loss function $\gamma_l$ is the minimum value when the loss function $\gamma_l$ satisfies:

$$\gamma_l < \gamma_{l-1} \quad (18)$$

$$\gamma_l < \gamma_{l+1} \quad (19)$$

When the loss function $\gamma_l$ is determined as the minimum value, the weighting values $W_T^{SkAi}$ and $W_T^{AiRj}$ obtained in the process of calculating the loss function $\gamma_l$ are employed as weighting values $W^{SkAi}$ and $W^{AiRj}$ of the respective connections, and these values are held. Namely, $$W^{SkAi} = W_T^{SkAi} \quad (20)$$

$$W^{AiRj} = W_T^{AiRj} \quad (21)$$

Also as to the output parameter, $$y_j = y_j' \quad (22)$$

Then, the learning operation in the learning means is terminated. If the loss function $\gamma_l$ is equal to zero, each output parameter $y_j$ is equal to a corresponding corrected color separation parameter $t_j$. Namely, $$y_j = t_j \quad (23)$$

When the loss function $\gamma_l$ is not zero, on the other hand, some of the output parameters $y_j$ are equal to corresponding corrected color separation parameters $t_j$, while the remaining output parameters $y_j$ become values approximate to the corresponding corrected color separation parameters $t_j$, or all output parameters $y_j$ become values approximate to the corresponding corrected color separation parameters $t_j$. Namely, $$y_i = t_i, y_j \approx t_j (i \neq j) \quad (24)$$

or $$y_j \approx t_j \quad (25)$$

When the loss function $\gamma_l$ is determined to be not the minimum value, on the other hand, the process is shifted to a step S158.

At the step S158, the loss functions $\gamma_l$ and $\gamma_{l+1}$ are replaced/held as loss functions $\gamma_{l-1}$ and $\gamma_l$ respectively, and the process is shifted to the step S155 to further correct the weighting values for the respective connections and obtain a new loss function $\gamma_{l+1}$, and thereafter a determination is again made as to whether or not the new loss function $\gamma_l$ becomes the minimum value. The aforementioned operations are repeated until the loss function $\gamma_l$ is determined to be the minimum value.

As hereinabove described, the learning means 15 is adapted to sequentially change connection strength between input parameters and output parameters to make the network perform desired information processing.

At a step S16, the learning results obtained at the step S15, i.e., the final weighting values $W^{SkAi}$ and $W^{AiRj}$ are set in the neural network 14, and the process is shifted to the step S8. Then, a series of operations are repeated until finished states of the color separation films 6 satisfy the requirement. When such processing is completed as to one original, a similar procedure is repeated as to a next original. Therefore, the neural network 14 can automatically perform setup processing approximate to that made by a skilled operator, as learning is repeated. After learning is performed in excess of a prescribed degree, requirement for correction of the setup parameter values P outputted from the neural network 14 is reduced, whereby preferable setup can be performed also when there is no skilled operator.

A memory may be provided independently, and the aforementioned learning results may be stored in the memory as coupling information suitable for each print orderer. FIG. 13 shows an example of providing such an independent memory to an automatic setup apparatus 10a. In the figure, learging results such as corrected weighting values are stored in a memory 17. In this case, it is possible to read out the learning results in response to each print orderer to use the same as weighting values of the neural network 14, thereby quickly implementing flexible image reproduction reflecting preference of the print orderer.

C. Modifications (1) While the weighting values of the respective connections of the neural network 14 are corrected by the learning means 15 so that the neural network 14 performs desired information processing in the preferred embodiment, it is also possible to make the neural network 14 perform desired information processing not by correcting the weighting values but by changing the input/output functions $f^{Sk}$, $f^{Ai}$ and $f^{Rj}$ at the respective nodes of the neural network 14 by the learning means 15. For example, the input/output functions may be mutually converted within the four types of functions shown in FIGS. 8(a) to 8(d), or, the input/output functions may be expressed as linear connections of the four types of functions shown in FIGS. 8(a) to 8(d) so that the respective coefficient values are changed as change of the input/output functions. Further, it is also possible to express input/output functions in an n-order polynominal as follows, to change respective coefficient values $a_0$ to $a_n$:

$$f^{Sk}(x_k) = a_0 + a_1 x_k + a_2 x_k^2 + \ldots + a_n x_k^n \quad (26)$$

(2) It is also possible to correct both the weighting values of the respective connections and the input/output functions of the respective nodes in combination by the learning means 15, to make the neural network 14 perform desired information processing. In this case, it is possible to select a method of correcting only the weighting values, correcting only the input/output functions, or correcting both the weighting values and the input/output functions in the respective layers of the neural network 14.

Namely, the parameter conversion rule may generally be corrected by learning.

(3) While the present invention is applied to a color scanner in the preferred embodiment, this invention is also applicable to a monochrome scanner, as a matter of course.

(4) The method of correcting setup parameter decision characteristics and the automatic setup apparatus according to the present invention are not restricted to the process scanner, but are also available for an apparatus for converting an image of an original to image data for recording for performing image reproduction, such as a printer, a facsimile, a copying machine, an electronic blackboard or the like, for example.

While the invention has been shown and described in detail, the foregoing description is in all aspects illustrative and not restrictive. It is therefore understood that numerous modifications and variations can be devised without departing from the scope of the invention.

What is claimed is:

1. A method of correcting setup parameter decision characteristics in an automatic setup apparatus for an image data converter for converting image data of an original to image data for recording, said method comprising the steps of:
   (a) automatically analyzing image information of an original thereby obtaining a first parameter value reflecting said image information;
   (b) inputting a second parameter expressing condition to be referred to in recording of an image of said original in said automatic setup apparatus through first operation input means;
   (c) converting values of a parameter group including said first and second parameter values to setup parameter values using a parameter conversion rule previously set in said automatic setup apparatus as said setup parameter decision characteristics;
   (d) setting said setup parameter values in said image data converter and thereafter converting said image of said original to image data for recording by said image data converter;
   (e) determining whether or not said parameter conversion rule is to be corrected with reference to a recorded image obtained from said image data for recording and supplying corrected setup parameter values suitable for conversion of image data of said original to said automatic setup apparatus through second operation input means when the parameter conversion rule same is to be corrected;
   (f) correcting said parameter conversion rule so that values equal or approximate to said corrected setup parameter values are obtained upon conversion of said parameter group; and
   (g) utilizing said parameter conversion rule corrected in said step (f) as said parameter conversion rule for said step (c) for a next original.

2. A method of correcting setup parameter decision characteristics in accordance with claim 1, wherein said step (c) comprises the steps of:
   (c-1) expressing said parameter conversion rule by conversion function; and
   (c-2) setting said conversion function in said automatic setup apparatus, and
   said step (f) comprises the step of:
   (f-1) correcting said parameter conversion rule by correcting a functional form of said conversion function.

3. A method of correcting setup parameter decision characteristics in accordance with claim 2, wherein said step (c-1) comprising the step of:
   (c-1-1) expressing said conversion function as a function of linear coupling of a plurality of functions, that is, $$_i\Sigma(W_i f_i)$$

where $W_i$ and $f_i$ represent a coefficient and a functional form, respectively.

4. A method of correcting setup parameter decision characteristics in accordance with claim 3, wherein said step (f-1) comprises the step of:
   (f-1-1) correcting functional form of said conversion function by correcting said coefficient $W_i$.

5. A method of correcting setup parameter decision characteristics in accordance with claim 3, wherein said step (f-1) further comprises the step of:
   (f-1-1) correcting conversion form of said conversion function by altering said functional form $f_i$.

6. A method of correcting setup parameter decision characteristics in accordance with claim 3, wherein said step (f-1) further comprises the step of:
   (f-1-1) correcting functional form of said conversion function by correcting said coefficient $W_i$ and altering said functional form $f_i$.

7. A method of correcting setup parameter decision characteristics in accordance with claim 3, wherein said step (e) comprises the steps of:
   (e-1) determining whether or not said parameter conversion rule is to be corrected;
   (e-2) supplying evaluation information reflecting evaluation results of said recorded image to said automatic setup apparatus via said second operation input means; and
   (e-3) supplying said corrected setup parameter values.

8. A method of correcting setup parameter decision characteristics in accordance with claim 7, wherein said step (b) comprises the steps of:
   (b-1) determining said second parameter value as a function of scene information representing image characteristics of said original and desired finish information representing desired finish values of said recorded image; and
   (b-2) inputting said second parameter value to said automatic setup apparatus via said first operation input means.

9. A method of correcting setup parameter decision characteristics in accordance with claim 8, wherein said step (g) comprises the steps of:
   (g-1) storing said parameter conversion rule corrected in said step (f) to a memory means provided to said automatic setup apparatus; and
   (g-2) utilizing said parameter conversion rule corrected in said step (f) as said setup parameter decision rule for said step (c) for a next original.

10. An automatic setup apparatus for an image data converter for converting image data of an orignial to image data for recording, comprising:
   (a) analyzer means for automatically analyzing image information of an original thereby providing a first parameter value reflecting said image information;
   (b) first operation input means for inputting a second parameter value expressing condition to be referred to in recording of an image of said original in said automatic setup apparatus;
   (c) a neural network connected to said analyzer means and first operation input means for converting values of a parameter group including said first and second parameter values to setup parameter values to be set in said image data converter using previously set wieghting values and functional forms;
   (d) second operation input means for inputting corrected setup parameter values suitable for conversion of image data of said original in said automatic setup apparatus; and
   (e) learning means connected to said neural network and said second operation input means, comprising:
      (e-1) means for correcting said weighting values or said functional forms so that said setup parameter values converted by said neural network are equal to or approximate to said corrected setup parameter values supplied by said second operation input means; and
      (e-2) means for supplying said corrected weighting values or said corrected functional forms to said neural network as new weighting values or new functional forms.

11. An automatic setup apparatus for an image data converter for converting image data of an original to image data for recording, comprising:
   (a) analyzer means for automatically analyzing image information of an original thereby providing a first parameter value reflecting said image information;
   (b) first operation input means for inputting a second parameter value expressing condition to be referred to in recording of an image of said original in said automatic setup apparatus;
   (c) a neural network connected to said analyzer means and first operation input means for converting values of a parameter group including said first and second parameter values to setup parameter values to be set in said image data converter using previously set weighting values and functional forms;
   (d) second operation input means for inputting corrected setup parameter values suitable for conversion of image data of said original in said automatic setup apparatus; and
   (e) learning means connected to said neural network and said second operation input means, comprising:
      (e-1) means for correcting said weighting values and said functional forms so that said setup parameter values converted by said neural network are equal to or approximate to said corrected setup parameter values supplied by said second input means; and
      (e-2) means for supplying said corrected weighting values and said corrected functional forms to said neutral network as new weighting values and new functional forms, respectively.

12. An automatic setup apparatus in accordance with claim 10, wherein
   said first operation input means comprises:
      (b-1) means for inputting said second parameter value determined as a function of scene information representing image characteristics of said original and desired finish information representing desired finish values of said recorded image.

13. An automatic setup apparatus in accordance with claim 12, wherein
   said second operation input means comprises:
      (d-1) means for inputting said corrected setup parameter values and evaluation information reflecting evaluation results of said image data for recording converted by said image data conversion apparatus, and
   said learning means comprises:
      (e-3) means for starting leaning operation in said leaning means by receiving said evaluation information inputted by said second operation input means.

14. An atuomatic setup apparatus in accordance with claim 13, further comprising:
   (f) data storage means for storing said first parameter value, said second parameter value and said setup parameter value converted by said neural network, wherein an input terminal is connected to output terminals of said analyzer means, said first operation input means and said neural network and an output terminal is connected to the input terminal of said learning means.

15. An automatic setup apparatus in accordance with claim 14, further comprising:
   (g) learning result storage means connected to said learning means for storing said corrected weighting values or said corrected functional forms obtained by said leanring means.

* * * * *